United States Patent

Warnock et al.

[15] 3,667,342
[45] June 6, 1972

[54] MAGNETIC WEAPON LINK TRANSDUCER

[72] Inventors: Frederick E. Warnock, Bethesda; John H. Malloy, Silver Spring, both of Md.

[73] Assignee: The United States of America as represented by the Secretary of the Navy

[22] Filed: Apr. 8, 1970

[21] Appl. No.: 26,479

[52] U.S. Cl..................................89/1.5 D, 102/70.2 R
[51] Int. Cl.................................................B64d 1/04
[58] Field of Search..................89/1.5, 1.5 B; 336/83, 84, 336/DIG. 2; 102/70.2 R

[56] References Cited

UNITED STATES PATENTS

| | | |
|---|---|---|
| 3,229,582 | 1/1966 | Schlie ....................................89/1.5 D |
| 3,387,606 | 6/1968 | Crafts et al.........................336/DIG. 2 |
| 3,435,725 | 4/1969 | Miller ....................................89/1.5 D |
| 2,918,845 | 12/1959 | Fleming ................................89/1.5 D |
| 3,211,057 | 12/1965 | White, Jr. et al......................89/1.5 D |

*Primary Examiner*—Samuel W. Engle
*Attorney*—R. S. Sciascia and J. A. Cooke

[57] ABSTRACT

A magnetic weapon link transducer transfers both power and option information signals from an ordnance delivery vehicle to an ordnance device. The transducer includes a plurality of magnetic cores of diverse diameters located in excitation and load units, respectively. Airgaps, which may be of diverse thicknesses, separate corresponding cores on the excitation and load units. Individual AC and RF shields are included to insure that only concurrent excitation of the transducer and weapon release will transfer the power and information signals from the delivery vehicle to the ordnance device.

7 Claims, 6 Drawing Figures

PATENTED JUN 6 1972

INVENTORS
Frederick E. Warnock
John H. Malloy

*J.O. Trenansky*
ATTORNEY

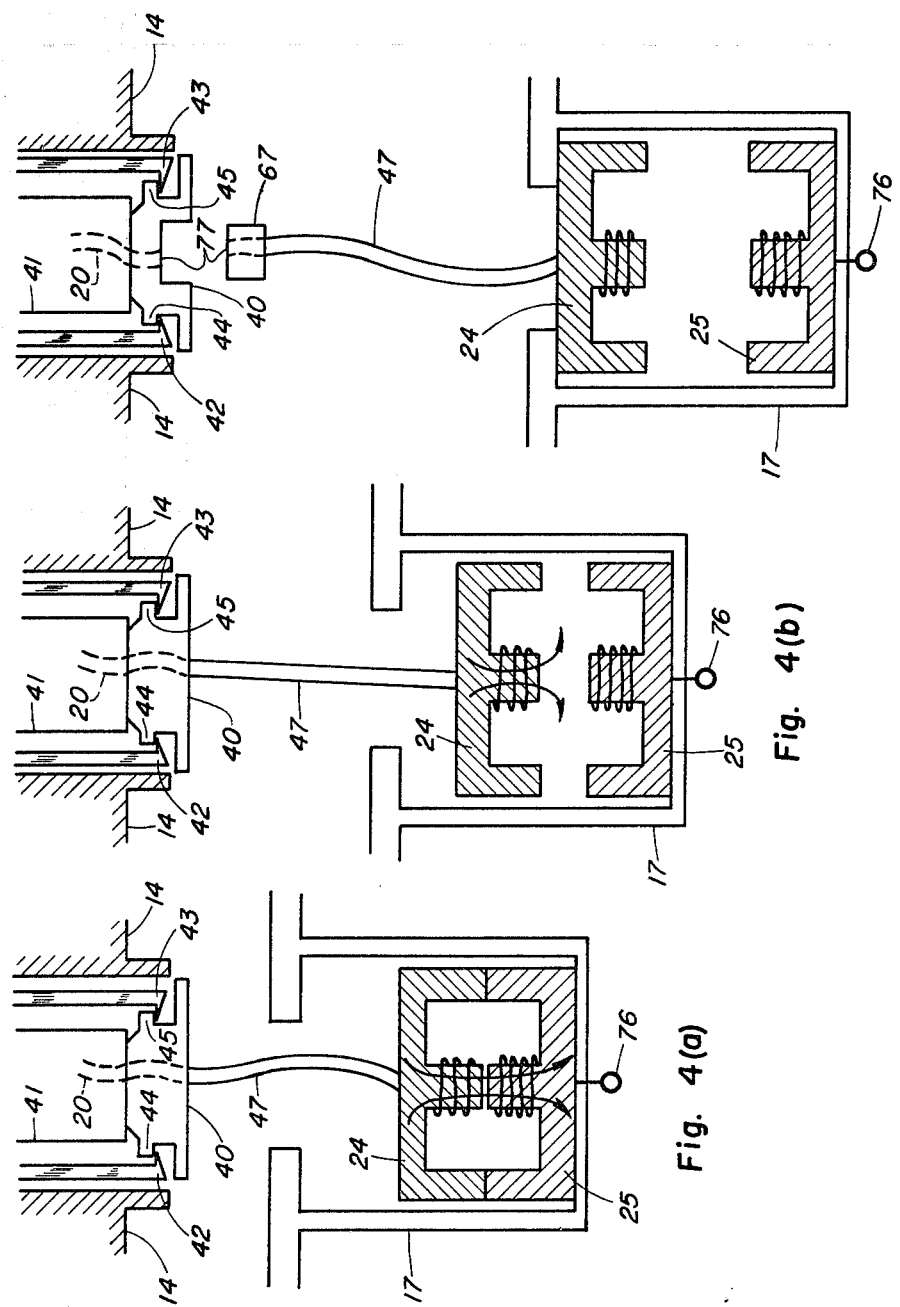

3,667,342

MAGNETIC WEAPON LINK TRANSDUCER

BACKGROUND OF THE INVENTION

This invention relates generally to magnetic transducers and, more particularly, to a magnetic weapon link transducer.

Magnetic transducers have been utilized in the ordnance fuze art to provide power transfer from an ordnance delivery vehicle such as an aircraft or the like to a bomb or other ordnance device attached thereto. An example of such a transducer is disclosed in U. S. Pat. No. 3,229,582 issued to R. W. Schlie on Jan. 18, 1966 for a "Mechanical Pulse Transformer." The aforementioned transducer provides power transfer at physical separation of the bomb and aircraft and concurrent excitation of the transducer, but provides a lesser transfer at excitation (or de-excitation) and physical separation occurring alone. The Schlie transducer has been satisfactory for most applications that merely have required a power link between the bomb and the aircraft.

Recently, however, ordnance fuze systems have been devised which provide multiple option selection for the bomb. Thus, these systems provide a plurality of detonation options, delivery modes, and arming times. To meet varying tactical situations and to provide weapon flexibility, it is desirable that these fuze systems include inflight option selection, that is, option selection while the bomb is on the aircraft.

To facilitate inflight selection, an aircraft weapon link is required which transfers option information as well as power from the aircraft to the bomb. The aforementioned Schlie transducer is somewhat unsuited for this purpose since it merely transfers power to the bomb and provides a somewhat large output signal at mere excitation or de-excitation of the transducer. The somewhat large signal at excitation of de-excitation, while not affecting detonation circuitry in the bomb, may be too large for the option circuitry and, therefore, may effect premature option selection prior to bomb release. Still furthermore, prior art transducers have not been capable of transferring the plurality of signals necessary for both bomb energization and weapon option selection nor have they been easily mounted on the aircraft bomb rack.

SUMMARY OF THE INVENTION

Accordingly, one object of the present invention is to provide a magnetic aircraft weapon link transducer for transferring both power and option information.

Another object of the present invention is to provide a magnetic transducer having two or more energy outputs dependent upon selective energization, independent or simultaneously, of two or more independent inputs.

Still another object of the instant invention to provide a magnetic transducer shielded from RF or AC signals.

Another object of this invention is to provide a magnetic transducer for transferring a plurality of signals.

Another object of the present invention is to provide a magnetic transducer capable of being easily mounted on an aircraft bomb rack.

Briefly, these and other objects of the present invention are attained by a magnetic transducer having a plurality of separable input and output cores. The cores are of different dimensions and are individually shielded to preclude AC and RF interference. A latch mechanism allows reliable and ease of mounting the bomb on the aircraft bomb rack.

BRIEF DESCRIPTION OF THE DRAWING

A more complete understanding of the invention and many of the attendant advantages thereof will be readily appreciated as the same becomes better understood by reference to the following detailed description when considered in connection with the accompanying drawing wherein:

FIGS. 4(a), 4(b) and 4(c) are schematic views of the release sequence of the magnetic transducer of the present invention.

DESCRIPTION OF THE PREFERRED EMBODIMENT

Figure 1:
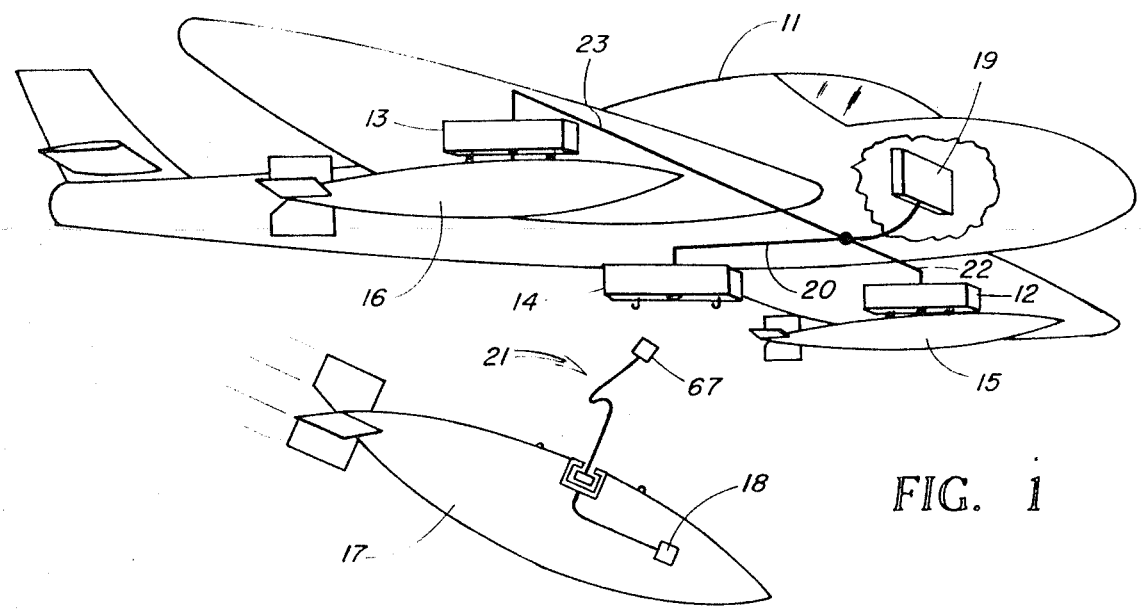
FIG. 1 is a schematic view of the overall fuze system utilizing the magnetic transducer of the present invention.

Referring now to the drawing wherein like reference numerals designate corresponding parts throughout the several views and more particularly to FIG. 1 thereof wherein an overall system utilizing the magnetic weapon link transducer is shown as including a conventional aircraft 11 having a plurality of bomb racks 12, 13 and 14 attached thereto. Releasably attached to the bomb racks in a conventional manner are ordnance devices, such as bombs 15, 16 and 17. Of course, a plurality of bombs may be attached to a single bomb rack or more bomb racks may be included or the like.

Included within bomb 17 is an arming and fuzing circuit 18 which may advantageously provide a plurality of arming and detonation options or the like selected by the pilot on a selection or control panel 19 located within the aircraft. As hereinafter more fully explained, both power and option information selected by the pilot on the control panel are transferred to arming and fuzing circuit 18 via an electrical lead 20 located on the aircraft and a magnetic aircraft weapon link transducer 21 located in the bomb. Other electrical leads 22 and 23 are connected to bombs 15 and 16, respectively, to transfer power and option information from the control panel on the aircraft to arming and fuzing circuits in the bombs via magnetic transducers (not shown). Thus, the fuze system utilizing the magnetic transducer of the present invention provides inflight option selection, that is selection of delivery mode, arming time, and detonation option, while the bomb is on the aircraft, and, therefore, provides weapon flexibility.

It is desirable that the bomb not be vulnerable to undesired external signals, such as stray RF or AC signals. Similarly, the bomb should not be detonated or armed or the like while it is on the aircraft nor should accidental release of the bomb or bomb jettison actuate the bomb. As hereinafter more fully explained, the arming and fuzing circuits located within the bomb will only receive power and option information from control panel 19 upon concurrent or simultaneous bomb release and DC energization from panel 19. Thus, mere excitation or de-excitation of the magnetic transducer 21 absent bomb separation from the aircraft or release of bomb 17 without DC excitation of the magnetic transducer will not actuate the arming and fuzing circuit.

Figure 2:
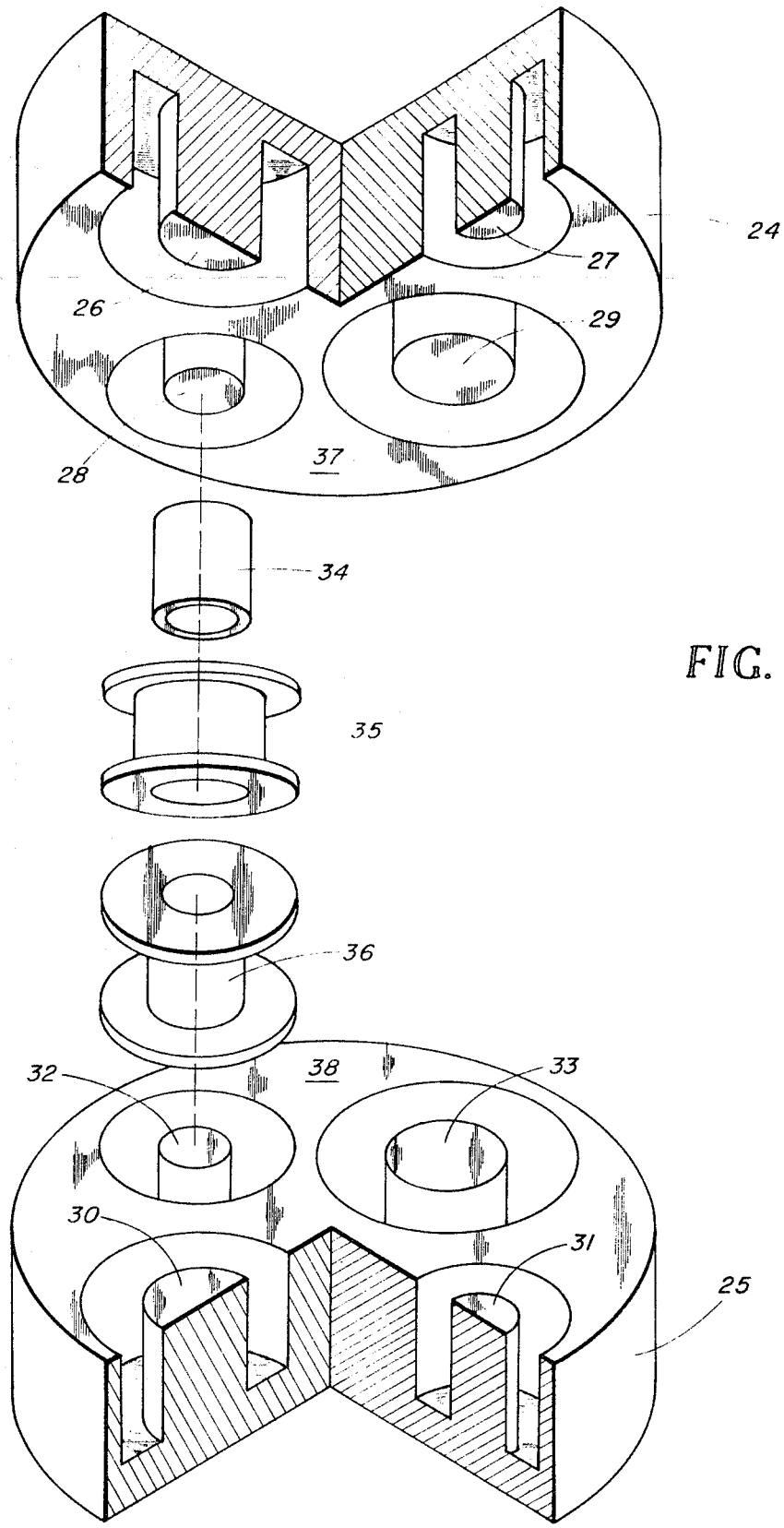
FIG. 2 is an exploded view, partly in section, of the core structure of the magnetic weapon link transducer according to the present invention.

Referring now to FIG. 2 of the drawing, the magnetic core structure and shielding elements of the magnetic transducer are shown. As illustrated therein, the magnetic transducer includes an input or excitation core unit 24 and an output or load core unit 25 made of suitable magnetic material, preferrable a material with a high permeability and low residual flux characteristics. The input core unit includes a plurality of cylindrical cores 26, 27, 28 and 29 adapted to be magnetically coupled with corresponding cylindrical cores 30, 31, 32 and 33, respectively, on the output core unit. To facilitate both power transfer and option information transfer from the control panel 19 to the bomb, the cylindrical cores are of different diameters. Thus, cores 26 and 29, which transfer both power and information energy from input core unit 24 to cores 30 and 33 of output core unit 25, are of the same diameter and equal to the diameter of cores 30 and 33. Similarly, cylindrical cores 27 and 28 are equal in diameter to their corresponding cores 31 and 32 on the output unit but are smaller in diameter than cylindrical cores 26 or 29. This is due, in part, to the fact that cores 27 and 28 are adapted to transfer option information to the bomb and not both option information and power. Of course, if it is desirable for all four cores to transfer both power and option information, the cores all may be the size of the larger diameter cores 26, 29, 30 and 33. Similarly, if it is desired that the magnetic transducer transfers only option information, the diameters all may be equal to that of the smaller cores.

A shorting turn 34, which may be of copper or the like, is frictionally engaged or otherwise connected to cylindrical core 28. The shorting turn serves to short out stray AC signals impressed on the input core and, as hereinafter more fully explained, prevents an electrical output from being transferred to the bomb at transducer excitation or de-excitation absent physical separation of units 24 and 25. Similarly, other shorting turns (not shown) are adapted to engage cylindrical cores 26, 27 and 29 of the input core unit.

To shield input core 28 from stray RF signals, as well as AC signals a coil form or Faraday shield 35, which may be made of aluminum or copper or any desired shielding material, cylindrically engages and is contiguous with the shorting turn 34. Similarly, other coil forms or Faraday shields (not shown) shield cores 26, 27 and 29 from stray RF signals.

The output unit 25 is similar in construction to input core unit 24, however, the shorting turns may be omitted on the cylindrical cores 30–33. Thus, a coil form or Faraday shield 36 cylindrically engages and is contiguous with core 32 to block RF signals while other coil forms (not shown) directly engage cores 30, 31 and 33.

As hereinafter more fully explained, the faces 37 and 38 of input core unit 24 and output core unit 25, respectively, are physically in contact and continuous with each other when the bomb is attached to the aircraft. To keep the core material from saturating and to keep residual flux at a low value, the cylindrical cores 26–29 and 30–33 are of such length that airgaps are provided between the corresponding cylindrical cores on the input and output units when the core faces 37 and 38 are in physical contact.

Figure 3:
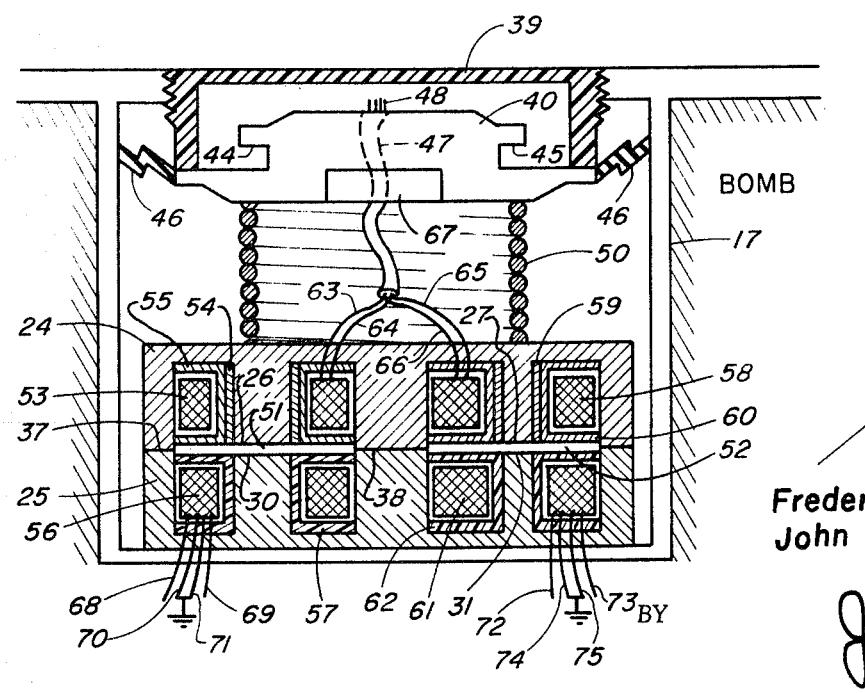
FIG. 3 is a sectional schematic view of the magnetic weapon link transducer and a portion of the aircraft bomb rack according to the instant invention.

The structural configuration of the magnetic transducer may best be understood by reference to FIG. 3 of the drawing which shows the magnetic transducer and part of the bomb rack in a sectional, schematic view. A protective cap 39 is included in the transducer to protect the transducer unit during transit or the like. When the protective cap is removed during loading of the bomb on the rack, a transducer connector 40 is exposed. The transducer connector 40 engages a rack connector 41 and is held in place by spring biased latches 42 and 43 at protrusions 44 and 45. An all-weather seal 46 is included in the magnetic transducer to protect the transducer and the circuitry attached thereto after the protective cap 39 has been removed and the bomb is mounted on the bomb rack. It is to be noted that latches 42 and 43 may or may not be the primary physical attachments between the entire bomb and the aircraft. In either case, however, they serve to connect the transducer to the weapon rack and, as hereinafter explained, to control panel 19.

The power and option information signals selected at the control panel and available at lead 20 are impressed upon the input or excitation core unit 24 via a lead or cable 47. Electrical contact between lead 20 and lead 47 is effected in any conventional manner, such as by male and female contacts 48 and 49, respectfully, which mate when latches 42 and 43 are in the proper physical relationship with protrusions 44 and 45.

Input core unit 24 is biased in physical contact with output core unit 25 by a compression spring 50 so that faces 37 and 38 are contiguous with each other. As hereinbefore explained, however, to minimize residual flux and saturation, airgap spaces are included between the corresponding cylindrical cores. Thus, an airgap 51 is provided between cylindrical cores 26 and 30 while an airgap 52 is provided between cylindrical cores 27 and 31. Due to the difference in diameters between cores 26, 30 and 26, 31 it is desirable that airgap 51 be larger than airgap 52. By way of example, airgap 51 may be approximately 0.02 inch and airgap 52 may be approximately 0.01 inch, depending, of course, on the diameter of the respective cylindrical cores.

Excitation windings 53 are wound around cylindrical core 26, a shorting turn 54, and a Faraday shield-coil form 55; while load windings 56 are wound around coil form 57 of cylindrical core 30. Similarly, excitation windings 58 are wound around cylindrical core 27, a shorting turn, and a coil form 60; while load windings 61 are wound around coil form 62 of cylindrical core 31.

The excitation windings 53 and 58 are layer wound around the cylindrical cores 26 and 27 and are excited by DC power or option information from lead 20 and control panel 19 via electrical leads 63, 64 and 65, 66, respectively, which are connected to the male contacts 48 via cable 47. As hereinafter more fully explained, cable 47 runs through a plug 67 which is frictionally engageable with transducer connector 40. Load windings 56 and 61 are bifilar wound and are provided with electrical leads 68, 69, 70 and 71 and 72, 73, 74 and 75, respectively, to provide output signals to arming and fuzing circuit 18. Leads 70 and 71 and leads 74 and 75 are grounded together, if desired, to resemble at its output a center-tapped transformer and, therefore, may be utilizable if ternary logic information and power signals are employed. It is apparent that additional excitation winding leads and load winding leads (not shown) are included for cylindrical cores 28 and 29 and cylindrical cores 32 and 33, respectfully. For ease of understanding, however, these leads and the male and female contacts associated therewith have been omitted from FIG. 3.

The operation of the magnetic transducer may best be understood by reference to FIGS. 4(a), 4(b) and 4(c) of the drawing which shows the energization and separation sequence of the bomb. As indicated in FIG. 4(a), the protective cap is removed and transducer connector 40 physically and electrically engages rack connector 41 via latches 42 and 43 and protrusions 44 and 45 and via leads 20 and 47, respectively. The input core unit is energized with power and/or option information from control panel 19 via leads 20 and 47. A flux path is created between the excitation core unit and the load core unit but, due to the shorting turn on the cylindrical core of the excitation unit, no electrical output is transferred via the load unit to a lead 76 and, therefore, no power or option information is transferred to arming and fuzing circuit 18.

At concurrent DC excitation and bomb release as indicated in FIG. 4(b), relative movement will occur between the excitation and load core units since load unit 25 is affixed to the casing of bomb 17. The sudden relative movement between the cores will cause the power or information stored in the excitation unit to be transferred to the load unit and, therefore, an output will occur at lead 76. It is to be noted that mere physical separation of the core units absent concurrent excitation, as in the case of bomb jettison or accidental bomb release, will not produce a power or option information output at lead 76.

Subsequent separation of the bomb causes plug 67 to be removed from transducer connector and causes cable 47 to shear at 77 as illustrated in FIG. 4(c). It is noted, however, that transducer connector 40 remains in a latching position with the bomb rack. Thus, the bomb rack is protected from the effects of fuel exhaust or the like which may adversely affect the bomb rack mechanism. The transducer connector may be removed upon subsequent loading of the bomb rack.

Obviously, numerous modifications and variations of the present invention are possible in the light of the above teachings. Thus, it is readily apparent that within the scope of the claimed invention, the invention may be practiced otherwise than as described herein.

What is claimed as new and desired to be secured by Letters Patent of the United States is:

1. A magnetic weapon link transducer comprising
an excitation core unit including a plurality of magnetizable cores located therein,
a load core unit mechanically separable from said excitation unit and including a plurality of magnetizable cores located therein and corresponding to said magnetizable cores located in said excitation unit,
means for biasing said excitation core unit and said load core unit in a continuous relationship,
shorting turn means individual to each of said plurality magnetizable cores located in said excitation unit for shielding said magnetizable cores from AC signals, coil form means individual to each of said plurality of magnetizable cores located in said excitation unit and in said load unit for shielding said magnetizable cores from RF signals, first winding means connectable to a source of excitation signals, and second winding means connectable to a load for transferring said excitation signals upon concurrent excitation of said first winding and relative movement of said excitation and load core units.

2. A magnetic weapon link transducer according to claim 1 wherein said plurality of magnetizable cores located in said excitation unit and said corresponding magnetizable cores located in said load unit are separated by airgaps.

3. A magnetic weapon link transducer according to claim 2 wherein said plurality of magnetizable cores located in said excitation unit are of diverse diameters, and said plurality of magnetizable cores located in said load unit are of corresponding diverse diameters.

4. A magnetic weapon link transducer according to claim 3 wherein said airgaps are of diverse thicknesses.

5. A magnetic weapon link transducer according to claim 1 wherein said source of excitation signals is located in an ordnance delivery vehicle, and said load is an ordnance device.

6. A magnetic weapon link transducer according to claim 5 wherein said source of excitation signals includes power signals and information signals transferred from said ordnance delivery vehicle to said ordnance device upon concurrent excitation of said magnetic transducer and separation of said delivery vehicle and said ordnance device.

7. A magnetic weapon link transducer according to claim 5 further including means in said magnetic transducer for physically and electrically connecting said delivery vehicle to said ordnance device, said connecting means remaining in said delivery vehicle upon delivery vehicle and ordnance device separation.

* * * * *